March 10, 1970 N. N. KOOMEN ET AL 3,500,007
INERTIA-SENSITIVE CIRCUIT BREAKER
Filed Jan. 31, 1968 3 Sheets-Sheet 1
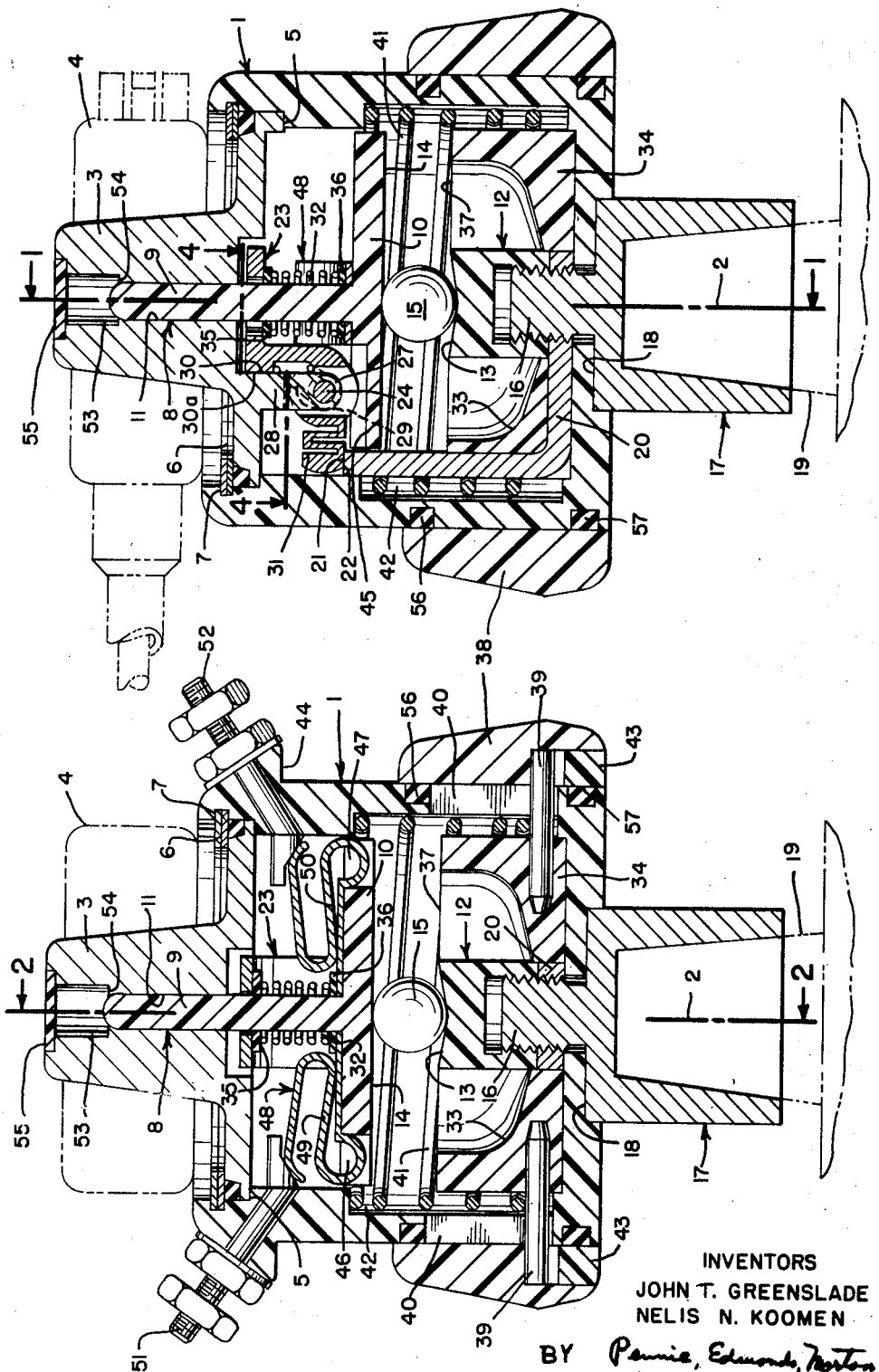
INVENTORS
JOHN T. GREENSLADE
NELIS N. KOOMEN
BY Pennie, Edmonds, Morton,
Taylor & Adams
ATTORNEYS

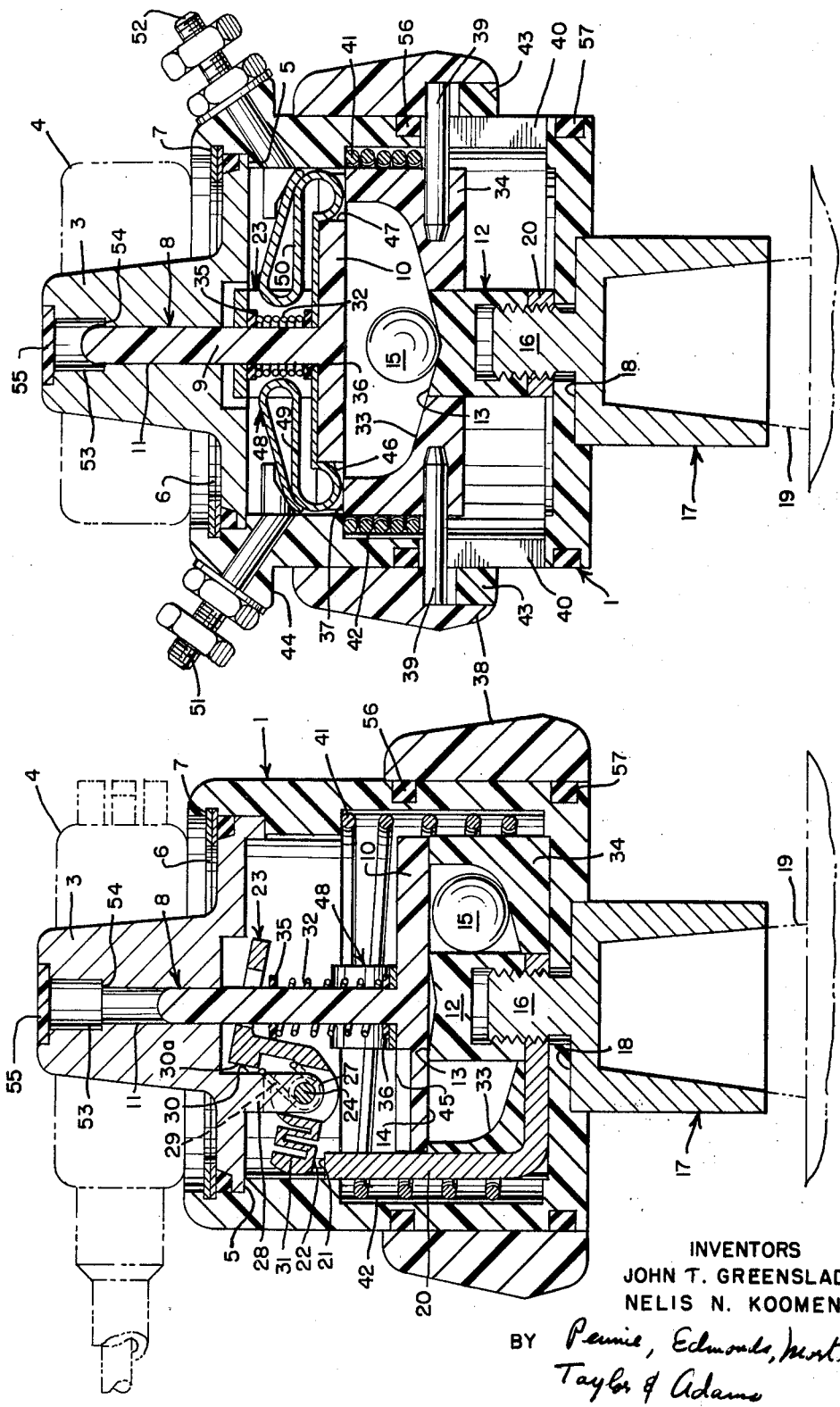

March 10, 1970    N. N. KOOMEN ET AL    3,500,007
INERTIA-SENSITIVE CIRCUIT BREAKER
Filed Jan. 31, 1968      3 Sheets-Sheet 3
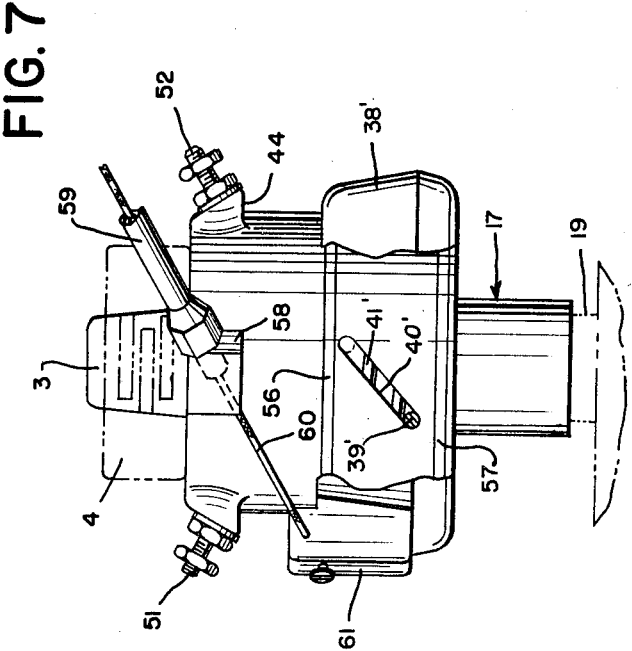
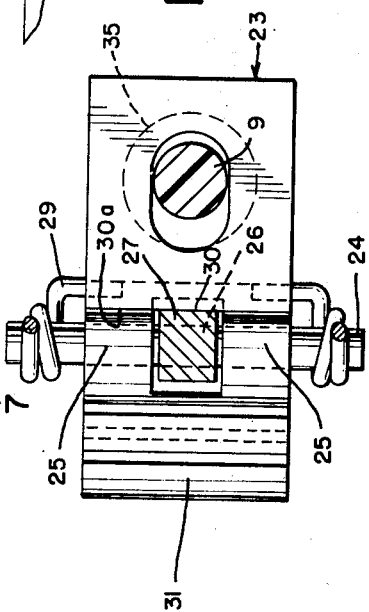
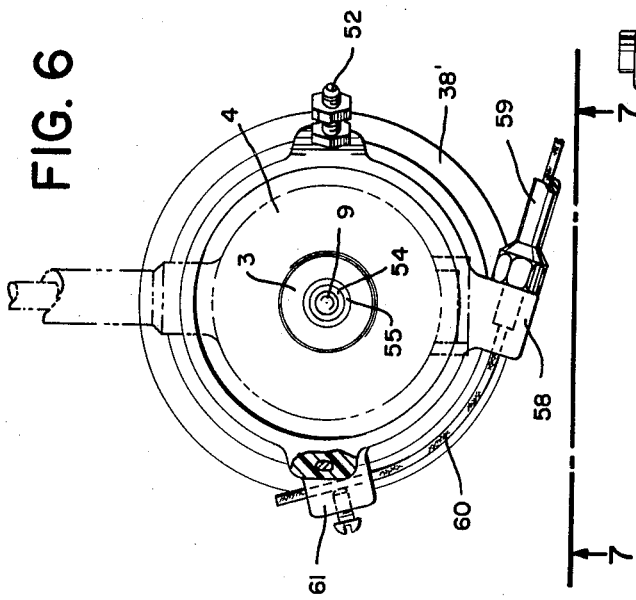
INVENTORS
JOHN T. GREENSLADE
NELIS N. KOOMEN
BY Pennie, Edmonds, Morton,
Taylor & Adams
ATTORNEYS United States Patent Office 3,500,007
Patented Mar. 10, 1970

3,500,007
INERTIA-SENSITIVE CIRCUIT BREAKER
Nelis N. Koomen, Phoenix, Ariz., and John T. Greenslade, Torrance, Calif., assignors to Talley Industries, Inc., Mesa, Ariz., a corporation of Delaware
Filed Jan. 31, 1968, Ser. No. 702,080
Int. Cl. H01h *35/02;* G08b *21/00*
U.S. Cl. 200—61.45                                   10 Claims

ABSTRACT OF THE DISCLOSURE

An inertia-sensitive circuit breaker suitable as an automotive safety device is provided which is compact and constructed to be directly mountable on an automobile storage battery, and wherein actuation of the device is effected by the release of an intertial ball when it is subject to a force component in any direction in a given plane. The ball does not form part of the electrical circuit broken by the device. Reset means are provided for conveniently and reliably resetting the ball to its initial position. Two pairs of electrical terminals are provided in one embodiment of the device for disconnecting both the storage battery and the generator from the automobile electrical system.

BACKGROUND OF THE INVENTION

Field of the invention

This invention relates to inertia-sensitive electrical switches, and in particular to an inertia-sensitive electrical circuit breaker.

Inertia-sensitive circuit breakers may be used in any body which is movable and in which it is desired to break an electrical circuit upon positive or negative acceleration of such body above a predetermined threshold acceleration value. Such circuit breakers are particularly useful as safety devices in vehicles, where they may be used to cut off electrical power in the vehicle when it is subjected to extraordinary forces, such as are produced in a collision. In automobilies (used in its broad sense to include trucks, buses and the like), for example, the widespread use of such a device could eliminate to a great extent the serious and often fatal damage caused by post-collision ignition of fuel or oil.

Post-collision fires result in general from one or more of three causes: Heat generated by friction during or immediately following the collision may ignite the fuel, particularly in view of the fact that meany parts of an automobile normally operate at high temperatures. Static electricity generated by friction between the automobile components and terrain over which it moves after the collision can also ignite the fuel. Particularly after the automobile has come to rest, however, the principal cause of fuel ignition is arcing due to short circuits in the automobile electrical system.

In order to prevent any such arcing after the initial impact of the collision, the storage battery conventionally used in automobiles must be disconnceted from the electrical system. Disconnection of the storage battery is not, however, sufficient to prevent electrically initiated fires because the engine-driven generator will ordinarily continue to supply power to the electrical system for some time after impact. Consequently, the generator (or alternator) as well as the battery must be disconnected by the circuit breaker upon impact in order to completely eliminate the possibility of arcing.

Description of the prior art

Several types of inertia-sensitive circuit breakers are known, some for use in preventing post-collision fires in automobiles. Certain of these devices are actuated only by forces along specified directional axes, while others are actuable by forces acting in more than one dimension.

Several circuit breakers are known in which a ball is supported under a predetermined spring force and is displaced from its support when the circuit breaker is acted upon by a sufficiently large inertial impulse. Almost all of such devices, however, are deficient in that the ball which is displaced in actuation of the circuit breaker is itself a part fo the electrical circuit to be broken upon actuation. This factor makes such devices unsuitable, particularly for current automotive requirements, because actuation of the device at the high current levels commonly encountered (on the order of hundreds of amperes) causes severe arcing at the ball. The problem of arcing aside, however, these units have been found to have a higher impedance than is desirable in order to be practically useful in the automotive field. For example, one unit of this type has been found to produce a two-volt drop at 300 amperes, a current level commonly attained in starting. In a 12 volt electrical system, this means that about 17% of the total available power is dissipated by the circuit breaker at starting.

Devices in which the current path does not include the inertial ball have certain other drawbacks, such as lack of means for breaking both the generator and battery circuits, failure to provide for convenient and reliable mounting in an automobile, and failure to provide adequate reset means. With respect to the last-mentioned drawback, the ball is commonly reset in known devices by lowering one of the surfaces for holding the ball below the immediately adjacent area into which the ball is ejected. upon actuation. The ball is thus permitted to roll back onto such surface, which is then lifted to clamp the ball in position to be actuated again. In so lifting the ball, it is vulnerable to being unintentionally displaced from the surface, preventing proper resetting of the device. The possibility of such unintentional displacement during reset is virtually eliminated by the present invention.

BRIEF DESCRIPTION OF THE INVENTION

In order to overcome these drawbacks, this invention provides an inertia-sensitive circuit breaker which is low in power dissipation, while at the same time, it is highly compact and reliable, to meet current automotive requirements. The circuit breaker of the invention is operable by a force component of over a predetermined threshold magnitude in any direction in a given plane. Such force component actuates the circuit breaker by effecting the release of an inertial ball to break one or more electrical circuits, none of which include the inertial ball. The term "inertial ball" is used herein to refer to that element of the circuit breaker which is directly affected by an inertial impulse acting upon the device to initiate interruption of the electrical circuits. The term is not restricted to a sphere, but includes any object capable of being released from between the surfaces holding it by a force of greater than threshold magnitude acting upon the circuit breaker in the manner described.

According to the invention, an axially moveable plunger and a pedestal axially opposite the plunger are disposed in a housing to form opposing surfaces capable of holding an inertial ball between them.

According to one embodiment of the invention, particularly suitable for automotive use, a pair of electrical terminals is formed integrally with the housing of the device and disposed on opposite ends of the housing such that the device may be completely and reliably supported by means of one such terminal, which is a female terminal, being mounted on and electrically connected to one terminal of the vehicle storage battery.

According to one embodiment of the invention, two pairs of terminals are provided on the circuit breaker, both actuated by release of the inertial ball, one pair for disconnecting the storage battery and the other pair for disconnecting the generator (or alternator) from the electrical circuit.

According to a particularly advantageous embodiment of the invention, means is provided for resetting the inertial ball to its initial (pre-actuation) position which is uniquely reliable and is compatible with remote operation.

DESCRIPTION OF THE DRAWINGS

The invention will be further described with respect to the particular embodiments illustrated in the accompanying drawings, in which:

FIG. 1 is a sectional view of an embodiment of the invention taken along the line 1—1 in FIG. 2, with the device in its initial (unactuated) position;

FIG. 2 is a sectional view of the embodiment of FIG. 1 taken along the line 2—2 in FIG. 1;

FIG. 3 is a view identical to that of FIG. 2 except that the device of FIGURE 2 is shown in its actuated position;

FIG. 4 is a sectional view taken along the line 4—4 in FIG. 2;

FIG. 5 is a view identical to that of FIG. 1 except that the reset means is shown resetting the inertial ball to its initial position;

FIG. 6 is a plan view of an embodiment of the invention capable of remote controlled reset;

FIG. 7 is a side elevation partly in section, taken along the line 7—7 in FIG. 6.

DETAILED DESCRIPTION OF THE INVENTION

In the embodiment of FIG. 1, a cylindrical housing 1 made of an insulating material such as nylon and open at the top defines a vertical axis 2 indicated in phantom line. The top closure 3 of the housing, formed of an electrically conductive material such as brass, extends axially upwardly to form a male electrical terminal for connection to an annular battery cable fitting 4. The base of top closure 3 extends outwardly and fits snugly into a notch or ridge 5 in the housing to seal the entire structure against dust and moisture. A split locking ring 6 fits into a slot 7 in the housing above the notch 5, to lock the top closure into the housing.

A plunger 8 formed of an electrically insulating material, for example nylon, and having an axially extending stem 9 and a flat base portion 10, is axially slideable in the housing. The stem 9 extends upwardly through an axial bore 11 in the top closure, which bore guides its movement.

Axially opposite the plunger 8, a pedestal 12 extends upwardly from the bottom of the housing so that its upper surface 13 and the lower opposing surface 14 of the plunger 8 are capable of holding an inertial ball 15 between them.

The lower portion of the pedestal 12 is internally threaded and fastened thereby to the upstanding externally threaded lug 16 of an electrical terminal 17. The terminal 17, formed of an electrically conductive material such as brass, is seated into a circular notch 18 so as to form an integral part of the housing 1 for securely structurally mounting the device on a terminal of a storage battery 19.

Viewing the pedestal 12 of FIG. 2, it is apparent that the pedestal screws down upon lug 16 to clamp between them (the pedestal and the housing) a bus bar 20 extending across the floor of the housing and up one side to about the level of the plunger 8. The top of bus bar 20 forms a contact surface 21 disposed to cooperate with a contact surface 22 on an electrically conductive lever 23. An internally threaded hole in bus bar 20 engages the terminal lug 16, providing good electrical contact between the bus bar and terminal 17 and securely positioning the bus bar in the housing.

The moveable electrical connector, or lever 23 is the means in the electrical circuit formed by the two terminals 3 and 17, bus bar 20 and lever 23 for breaking the circuit. Referring to FIGS. 2 and 4, the lever 23 is pivoted on a pin 24 extending through opposed horizontal sleeves 25 formed by the lever and through a sleeve 26 aligned with sleeves 25 which is formed by a lug 27 extending from a downwardly depending stud 28 on the top closure 3. The pin 24 extends in both directions beyond the sides of the lever, and a wire spring 29 mounted on those extensions tends to rotate the lever clockwise, as seen in FIG. 2. A surface 30 of stud 28 and the corresponding surface 30a formed by an extension of the lever are accurately formed and disposed to be contiguous when the lever is in the position shown (FIG. 2), thereby making good electrical contact between the lever and the male electrical terminal formed by top closure 3.

One end of the lever 23 contains a slightly elongated hole through which the plunger stem 9 extends. That portion 31 of the lever extending from the pin in the opposite direction is notched from the top and bottom to give it increased resiliency. For the same purpose, the lever may be made of spring copper or brass. The portion 31 terminates in a contact surface 22 abutting contact surface 21, completing the electrical circuit between the bus bar and the top closure 3.

The plunger and lever are held in the position shown in FIGS. 1 and 2 by a coil spring 32 disposed about plunger stem 9 and acting between the lever and base portion 10 of the plunger. The force exerted by this coil spring is much greater than that exerted by spring 29; consequently, the lever is held firmly in its counter-clockwise-most position, contact edge 30 and the corresponding surface of the lever is held firmly in its counter-clockwise-most position portion 31 of the lever is sprung slightly to make good electrical contact between surfaces 21 and 22.

Actuation of the device occurs when a force component of greater than a predetermined threshold magnitude acts upon it in any direction in the plane defined by the axis as its normal. This does not mean of course, that the entire force vector must lie in the plane so defined. The threshold force is determined by the surface properties and shapes of opposing surfaces 13 and 14, the force exerted by springs 29 and 32 (primarily the latter) and the mass and surface properties of inertial ball 15. Upon actuation, the ball 15 escapes from between the pedestal and the plunger, falling into the cup defined by the inner surface 33 of reset member 34. When thus released, the plunger moves downward toward pedestal 12, principally under the force of coil spring 32, which acts against lever 23. Washers 35, 36 are provided at both ends of the spring. Spring 32 is compressed, in the initial position of the plunger, a distance somewhat less than the plunger-to-pedestal distance, so that part way through the plunger stroke, the coil spring ceases to have any effect. The (weaker) spring 29 is then free to rotate lever 23 clockwise about pin 24, immediately separating contact surfaces 21 and 22 to break the electrical circuit between terminals 3 and 17. The downward stroke of the plunger is stopped by the pedestal, preventing the inertial ball from returning to its initial position.

To reset the ball to its initial position from its position after actuation, which is in the cup 33 formed by annular reset member 34, the annular reset member is slid axially upward. As it is raised so that pedestal surface 13 becomes continuous with the inner cup surface 33 the inertial ball rolls back onto the pedestal. To permit replacement of the ball, the upper contact surface 37 of the annular member 34 forces the plunger upward as member 34 is raised. In certain known devices the lower of the surfaces holding the ball is lowered into a depression so that the ball rolls onto it, and then raised to meet the opposing upper holding surface. Under other than optimum conditions, the ball can easily slip from the lower surface as it is being raised, preventing reset. In contrast, this invention makes it virtually impossible for reset failure to occur. Contact surface 37 is at a height above pedestal 13 such that it raises the plunger just high enough to accommodate the inertial ball as the ball rolls onto the pedestal. Minimum downward travel of reset member 34 is then required to clamp the ball between the pedestal and the plunger.

The annular reset member 34 is controlled by an external annular reset actuator 38 connected to it by pins 39 extending through and guided by elongated vertical slots 40 in the housing. A coil spring 41 in a cylindrical cutout 42 biases the reset means downward. To facilitate assembly of the device pins 39 may be locked in slots left in the reset actuator by plugs 43.

As illustrated in FIG. 2, the base 10 of the plunger, cut out to form a notch 45, provides operating clearance for lever 23. The base 10 is also notched at opposite sides 46, 47 to permit a contact assembly 48 to be mounted on it. Contact assembly 48, which may be made of a resilient conductive material such as spring brass or copper, includes opposed spring arms 49 and 50 which contact the inner ends of a second pair of electrical terminals 51, 52 mounted on the housing. Springs arms 49 and 50 are formed so as to deform only slightly from their unstressed positions when the device is in its initial, or unactuated, position shown in FIG. 1. Consequently, the contact between the spring arms and respective terminals 51 and 52 is broken after actuation early in the plunger's downward travel, assuring disconnection of the generator circuit, which is connected through the second terminal pair.

The upper portion 53 of bore 11 is slightly wider than the remainder of the bore, forming a shoulder 54 at a height such that the top of plunger stem 9 protrudes slightly above the shoulder as illustrated in FIG. 1. The top of the bore is closed by a fitting 55 of transparent plastic press-fit into the top closure. After actuation of the device, the top of the plunger stem can be seen through the transparent plastic 55 to be below shoulder 54. By this means, it can conveniently be determined at a glance whether or not the device has been actuated.

It will be apparent that the particular construction of this device renders it highly impervious to moisture, dirt and grease prevalent in engine compartments, making it highly reliable as a safety measure. The entire unit is sealed, O-rings 56 and 57 being provided on the housing adjacent the reset actuator to prevent contamination through slots 40.

FIGURES 6 and 7 illustrate an embodiment of the invention capable of being reset from a point remote from the device. An anchor stud 58 extending from the housing is shaped to accommodate a flexible control cable 59, the control end of which may be mounted on the dashboard of the automobile. The central moveable control wire 60 of control cable 59 is fastened to a second anchor stud 61 on the annular reset actuator 38'.

The slots 40' in the housing in which pins 39' are guided extend helically in this embodiment rather than axially, as in that of FIG. 1. Therefore, rotation of annular reset actuator 38' raises the reset member (not shown) to reset the device to its initial position.

Normally, the two anchor studs 58 and 61 are angularly displaced from one another by an amount sufficient to permit operation of the control cable to move lug 61 angularly toward lug 58, but not so great as to hinder operation of the control cable. This rotates the reset actuator 38' to reset the device. When control pressure on the reset cable 59 is released, bias spring 41' returns the reset actuator to its home position.

For securely mounting the device on a battery terminal, the inner surface of female terminal 17 is frusto-conical and is split axially. A metal band placed around the outside of the terminal and having a screw-tightening adjustment (not shown) is used to tighten terminal 17 upon the battery. Alternatively, a cam-locking pin extending transversely through and on one side of the interior of female terminal 17 may be used to firmly clamp the device to the battery terminal. However, this type of connection is satisfactory only if the battery terminal is made of a material sufficiently hard to hold the cam lock.

It will be apparent to those skilled in the art that various modifications may be made of the above-described embodiments without departing from the scope and spirit of the invention.

We claim:
1. An inertia-sensitive circuit breaker operable by a force component of over a predetermined threshold magnitude in any direction in a given plane, wherein such force component actuates the circuit breaker by effecting the release of an inertial ball to break one or more electrical circuits, none of which includes said ball, said circuit breaker comprising:
   a housing defining an axis normal to the given plane;
   a plunger axially moveable within the housing, a pedestal in the housing disposed axially opposite the plunger, which pedestal and plunger form opposing surfaces capable of holding an inertial ball between them;
   a first pair of electrical terminals formed on said housing, one such terminal being a female terminal for mounting the circuit breaker on the storage battery and the other terminal being formed for connection to a battery cable;
   a pair of electrical contacts disposed within said housing each connected to a respective one of said terminals;
   a moveable electrical connector actuable to electrically connect said contacts;
   an inertial ball disposed between the pedestal and the plunger;
   first bias means disposed between the moveable electrical connector and said plunger for urging the plunger toward the pedestal with a predetermined force and for urging the connector to electrically connect said contacts, when the pedestal and plunger are separated by said inertial ball; and
   a second bias means for biasing said electrical connector to electrically disconnect said electrical contacts from each other upon displacement of said inertial ball from the pedestal in response to such force component.

2. An inertia-sensitive circuit breaker as defined in claim 1 including a second pair of electrical terminals connected by a second electrical circuit; and
   second circuit breaking means responsive to actuation of said plunger for breaking said second electrical circuit.

3. An inertia-sensitive circuit breaker operable by a force component of over a predetermined threshold magnitude in any direction in a given plane, wherein such force component actuates the circuit breaker by effecting the release of an inertial ball to break one or more electrical circuits, none of which includes said ball, said circuit breaker comprising;
   a housing defining an axis normal to the given plane;
   a plunger axially moveable within the housing, a pedestal in the housing disposed axially opposite the plunger, which pedestal and plunger form opposing surfaces capable of holding an inertial ball between them, and first bias means for urging the plunger toward the pedestal with a predetermined force;

an inertial ball held between the pedestal and the plunger under the action of said first bias means and displaceable therefrom by such force component;

a first pair of electrical terminals formed integrally with said housing and disposed on axially opposite ends thereof, one such terminal being a female terminal for directly mounting the circuit breaker on a storage battery and the other terminal being formed for direct connection to a battery cable, and a first electrical circuit connecting the first pair of terminals;

first means responsive to movement of the plunger toward the pedestal upon release of the inertial ball from between the plunger and the pedestal, for breaking said electrical circuit and maintaining it in such broken condition;

said first electrical circuit including a lever hinged with respect to said housing for movement between a first position, in which said first electrical circuit is made, and a second position, in which said first electrical circuit is broken; and second bias means biasing said lever toward its second position; and wherein the first bias means is disposed to act between the lever and the plunger to maintain the lever in its first position when the plunger is in its initial position, and to permit the lever to attain its second position, under the urging of the second bias means, when the plunger is actuated, whereby the first electrical circuit is broken.

4. An inertia-sensitive circuit breaker as defined in claim 3 including a second pair of electrical terminals connected by a second electrical circuit, and second circuit breaking means responsive to actuation of said plunger for breaking said second electrical circuit, said second electrical circuit comprising an electrical conductor mounted and positioned on said plunger to contact both of the second pair of electrical terminals when the plunger is in its initial position and to break contact with at least one of the last-mentioned pair of electrical terminals upon actuation of the plunger.

5. An inertia-sensitive circuit breaker as defined in claim 4 including reset means for resetting said plunger to its initial position, in which it is separated from the pedestal by the inertial ball, and replacing the inertal ball between the plunger and the pedestal, said reset means including:

an axially moveable annular reset member, the inner surface of which forms a cup about said pedestal for receiving the inertial ball when it is released, said annular member having a contact surface disposed to contact the plunger for raising it during reset;

reset actuating means external to the housing for axially moving the annular member toward the plunger, whereby said contact surface contacts and raises the plunger away from the pedestal and the inertial ball is guided by the cup-shaped inner surface of the reset member back onto the pedestal; and said housing contains axially extending slots, and said reset actuating means is an annular sleeve disposed about said housing and connected to said annular member by pins extending through said slots, so that raising the annular sleeve raises the annular member to reset said plunger.

6. An inertia-sensitive circuit breaker as defined in claim 4 including reset means for resetting said plunger to its initial position, in which it is separated from the pedestal by the inertial ball, and replacing the inertial ball between the plunger and the pedestal, said reset means including:

an axially moveable annular reset member, the inner surface of which forms a cup about said pedestal for receiving the inertial ball when it is released, said annular member having a contact surface disposed to contact the plunger for raising it during reset;

reset actuating means external to the housing for axially moving the annular member toward the plunger, whereby said contact surface contacts and raises the plunger away from the pedestal and the inertial ball is guided by the cup-shaped inner surface of the reset member back onto the pedestal; and said housing containing helically extending slots, and said reset actuating means being an annular sleeve disposed about said housing and connected to said annular member by pins extending through said slots, whereby rotation of the annular sleeve with respect to the housing raises the annular member to reset the plunger to its initial position.

7. An inertia-sensitive circuit breaker as defined in claim 6 wherein said housing includes an axial, upwardly extending bore forming an externally visible shoulder near its top-most surface and the plunger includes a stem extending upwardly through said bore to said shoulder when the plunger is in its initial position, whereby actuation of the plunger changes the level of the stem with respect to said shoulder, visibly indicating that the circuit breaker has been actuated.

8. An inertia-sensitive circuit breaker as defined in claim 6 including a flexible control cable having a sheath and a central control wire moveable axially with respect to said sheath, said sheath and control wire being connected respectively to said housing and to said reset actuating means and being actuable to rotate the reset actuating means with respect to the housing for resetting the circuit breaker.

9. An inertia-sensitive circuit breaker operable by a force component of over a predetermined threshold magnitude in any direction in a given plane, wherein such force component actuates the circuit breaker by effecting the release of an inertial ball to break one or more electrical circuits, none of which includes said ball, said circuit breaker comprising:

a housing defining an axis normal to the given plane;

a plunger axially moveable within the housing, a pedestal in the housing disposed axially opposite the plunger, which pedestal and plunger form opposing surfaces capable of holding an inertial ball between them, and first bias means for urging the plunger toward the pedestal with a predetermined force;

an inertial ball held between the pedestal and the plunger under the action of said first bias means and displaceable therefrom by such force component;

a first pair of electrical terminals formed integrally with said housing and disposed on axially opposite ends thereof, one such terminal being a female terminal for directly mounting the circuit breaker on a storage battery and the other terminal being formed for direct connection to a battery cable, and a first electrical circuit connecting the first pair of terminals;

a second pair of electrical terminals on the housing connected by a second electrical circuit;

first circuit breaking means responsive to movement of the plunger toward the pedestal, upon release of the inertial ball from between the plunger and the pedestal, for breaking said first electrical circuit and maintaining it in such broken condition;

second circuit breaking means responsive to actuation of said plunger for breaking the second electrical circuit; and said first electrical circuit including a lever hinged with respect to said housing, for movement between a first position, in which said first electrical circuit is made, and a second position, in which said first electrical circuit is broken; second bias means biasing said lever toward its second position; and wherein the first bias means is disposed to act between the lever and the plunger to maintain the lever in its first position when the plunger is in its initial position, and to permit the lever to attain its second position, under the urging of the second bias means, when the plunger is actuated, whereby the first electrical circuit is broken.

10. An inertia-sensitive circuit breaker as defined in claim 9 wherein said second electrical circuit comprises: an electrical conductor mounted and positioned on said plunger to contact both terminals of the second pair of electrical terminals when the plunger is in its initial position and to break contact with at least one terminal of the last-mentioned pair of electrical terminals upon actuation of the plunger.

References Cited

UNITED STATES PATENTS 2,806,915  9/1957  Fowler _____ 200—61.45

FOREIGN PATENTS 779,272  8/1957  Great Britain.

ROBERT K. SCHAEFER, Primary Examiner

M. GINSBURG, Assistant Examiner

U.S. Cl. X.R.

340—262